US012556361B2

(12) United States Patent
Yan et al.

(10) Patent No.: US 12,556,361 B2
(45) Date of Patent: Feb. 17, 2026

(54) SWITCHING SYSTEM, METHOD AND APPARATUS OF CLOCK CIRCUIT, AND NON-TRANSITORY READABLE STORAGE MEDIUM

(71) Applicant: SUZHOU METABRAIN INTELLIGENT TECHNOLOGY CO., LTD., Jiangsu (CN)

(72) Inventors: Long Yan, Jiangsu (CN); Yuejun Guo, Jiangsu (CN); Guangle Zhang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/117,006

(22) PCT Filed: Sep. 27, 2024

(86) PCT No.: PCT/CN2024/121990
§ 371 (c)(1),
(2) Date: Mar. 28, 2025

(87) PCT Pub. No.: WO2025/087002
PCT Pub. Date: May 1, 2025

(65) Prior Publication Data
US 2026/0005829 A1    Jan. 1, 2026

(30) Foreign Application Priority Data
Oct. 25, 2023  (CN) .......................... 202311386920.7

(51) Int. Cl.
*H04L 7/027* (2006.01)
*G06F 11/16* (2006.01)

(52) U.S. Cl.
CPC .......... *H04L 7/027* (2013.01); *G06F 11/1604* (2013.01)

(58) Field of Classification Search
CPC ............................. H04L 7/027; G06F 11/1604
See application file for complete search history.

(56) References Cited

U.S. PATENT DOCUMENTS

| 6,920,622 | B1 | 7/2005 | Garlepp |
| 2007/0230647 | A1 | 10/2007 | Pourbigharaz |
| 2010/0002679 | A1 | 1/2010 | Zhang |

FOREIGN PATENT DOCUMENTS

| CN | 200990088 Y | 12/2007 |
| CN | 106658626 A | 5/2017 |

(Continued)

OTHER PUBLICATIONS

The search report of CN application No. 202311386920.7 issued on Nov. 28, 2023.

(Continued)

*Primary Examiner* — Vineeta S Panwalkar
(74) *Attorney, Agent, or Firm* — Scully, Scott, Murphy & Presser, P.C.

(57) ABSTRACT

A switching system, method and apparatus of a clock circuit, and a non-transitory readable storage medium are provided. A clock switching component is configured to collect a first clock signal generated by the clock generating component. The controller determines, based on the first clock signal and a second clock signal generated by a reference clock, a frequency offset between the clock generating component and the reference clock, and sends, in response to the first clock signal and the frequency offset both satisfy set anomaly conditions, a switching signal to the clock switching component. The clock switching component controls the clock generating component to switch a current clock to a standby clock based on the switching signal. The controller (Continued)

identifies, based on the first clock signal and the frequency offset, an operating state of the current clock.

20 Claims, 3 Drawing Sheets

(56) References Cited

FOREIGN PATENT DOCUMENTS

| | | |
|---|---|---|
| CN | 110690894 A | 1/2020 |
| CN | 110795289 A | 2/2020 |
| CN | 112887122 A | 6/2021 |
| CN | 115328267 A | 11/2022 |
| CN | 117112316 A | 11/2023 |

OTHER PUBLICATIONS

The search report of PCT application No. PCT/CN2024/121990 issue on Jan. 2, 2025.
Chinese First Office Action dated Nov. 30, 2023 issued in 202311386920.7.

SWITCHING SYSTEM, METHOD AND APPARATUS OF CLOCK CIRCUIT, AND NON-TRANSITORY READABLE STORAGE MEDIUM

CROSS-REFERENCE TO RELATED APPLICATION

The disclosure claims the benefit of priority to Chinese Patent Application No. 202311386920.7, filed with the China Patent Office on Oct. 25, 2023 and entitled "Switching system, method and apparatus of clock circuit, and medium", which is incorporated in its entirety herein by reference.

TECHNICAL FIELD

Examples of the disclosure relate to the technical field of computers, and particularly relate to a switching system, method and apparatus of a clock circuit, and a non-transitory readable storage medium.

BACKGROUND

Coordination among various components is indispensable to powerful system performance of an integrated digital product. A clock circuit, which is a common component of the integrated digital product, has a function of providing an internal time reference signal of the integrated digital product. As a vital component of the integrated digital product, the clock circuit is related to system timeliness and stability.

A single clock circuit is mostly designed as a clock of a current switch. That is, reliability of a system clock depends on reliability of the single clock circuit. When the single clock circuit malfunctions, a service will be disordered, and the system will shut down in a severe case.

According to a current design method, the problem of a clock failure can be solved only by replacing a related device of the clock circuit, such as a crystal, a crystal oscillator and a load capacitor. But a system service will be directly interrupted by component replacement, resulting in a stability deviation of system operation.

Thus, how to improve stability of system operation is a problem to be solved by those skilled in the art.

SUMMARY

An objective of examples of the disclosure is to provide a switching system, method and apparatus of a clock circuit, and a non-transitory computer-readable storage medium, which can solve a problem of poor stability of system operation.

In order to solve the above problem, a first aspect of examples of the disclosure provides a switching system of a clock circuit. The system includes a clock generating component, a clock switching component and a controller; wherein the clock generating component includes at least two clocks; a reference clock is integrated into the controller; the clock switching component is connected to the clock generating component and the controller;

the clock switching component, configured to collect a first clock signal generated by the clock generating component and transmit the first clock signal to the controller, receive a switching signal sent by the controller, and control, based on the switching signal, the clock generating component to switch a current clock to a standby clock. The standby clock is any one of all other clocks of the clock generating component except the current clock;

the controller, configured to receive the first clock signal transmitted by the clock switching component, determine, based on the first clock signal and a second clock signal generated by the reference clock, a frequency offset between the clock generating component and the reference clock; and send, in response to that the first clock signal and the frequency offset both satisfy set anomaly conditions, the switching signal to the clock switching component, to complete clock switching in the clock generating component.

In an embodiment, the controller is configured to sample the first clock signal and the second clock signal to obtain a first digital signal and a second digital signal, and determine, based on the first digital signal and the second digital signal, the frequency offset between the clock generating component and the reference clock.

In an embodiment, the controller is configured to judge whether the first digital signal is a constant, send, in response to the first digital signal being a constant, the switching signal to the clock switching component, judge, in response to the first digital signal being not a constant, whether the frequency offset is greater than a standard frequency offset, and send, in response to the frequency offset being greater than the standard frequency offset, the switching signal to the clock switching component.

In an embodiment, the controller is connected to a managing component;

the controller, configured to transmit, in response to the first digital signal being a constant, to the managing component, fault information indicating that a clock stops oscillating, and transmit, in response to the first digital signal being not a constant and the frequency offset being greater than the standard frequency offset, fault information indicating that a frequency of a clock is abnormal to the managing component.

In an embodiment, the number of pins of the controller connected to the managing component is the same as the number of clocks included in the clock generating component.

In an embodiment, in response to the clock generating component includes two clocks, a first output pin of the controller is connected to a first input pin of the managing component; a second output pin of the controller is connected to a second input pin of the managing component;

the controller, configured to control, in response to the first digital signal of the first clock being a constant or in response to the first digital signal being not a constant and the frequency offset being greater than the standard frequency offset, the first output pin to output a low level; and the managing component, configured to display, in response to detecting that the first input pin is at the low level, warning information of a first clock fault.

In an embodiment, the managing component is connected to a warning component, the managing component, configured to control, in response to receiving fault information transmitted by the controller, the warning component to enable a warning mode matching a type of the fault information.

In an embodiment, the warning component is an indicator light arranged on a front panel of a device;

the managing component, configured to control, in response to receiving the fault information indicating that a clock stops oscillating transmitted by the controller, the warning component to switch the indicator light corresponding to the current clock to a red light;

the managing component, configured to control, in response to receiving the fault information indicating that a frequency of a clock is abnormal transmitted by the controller, the warning component to switch the indicator light corresponding to the current clock to a yellow light.

In an embodiment, the managing component is configured to display, in response to receiving fault information transmitted by the controller, the fault information through a human-computer interaction interface.

In an embodiment, the controller is configured to increase the number of times of clock calling by one every time a switching signal is sent to the clock switching component, where the number of times of clock calling is one in an initial state; judge, in response to the first clock signal and the frequency offset both satisfy the set anomaly conditions, whether the number of times of clock calling is less than a total number of clocks included in the clock generating component; send, in response to the number of times of clock calling being less than the total number of clocks included in the clock generating component, the switching signal to the clock switching component; and transmit, in response to the number of times of clock calling being greater than or equal to the total number of clocks included in the clock generating component, warning information indicating that a clock is unusable to the managing component.

In an embodiment, the controller is configured to adjust, in response to receiving a reminder message indicating that a clock is successfully repaired sent by the managing component, the number of times of clock calling based on the number of clocks successfully repaired carried in the reminder message.

In an embodiment, the controller is configured to judge whether a data amount of the first digital signal and a data amount of the second digital signal reach quantity thresholds, and carry out, in response to the data amount of the first digital signal and the data amount of the second digital signal both reach the quantity thresholds, a step of determining, based on the first digital signal and the second digital signal, the frequency offset between the clock generating component and the reference clock.

In an embodiment, the controller is configured to multiply the first digital signal and the second digital signal together to obtain a mixed signal, extract a frequency deviation signal from the mixed signal, carry out fast Fourier transform on the frequency deviation signal to determine a frequency deviation point, and determine, based on the frequency deviation point and a number of sampling points, the frequency offset.

In an embodiment, the controller is configured to extract the frequency deviation signal from the mixed signal by a low filter.

In an embodiment, the controller is configured to carry out the fast Fourier transform on the frequency deviation signal, to obtain an impulse function with the number of sampling points as an abscissa and an operation result of the fast Fourier transform as an ordinate, and take a number of sampling points corresponding to a maximum operation result as the frequency deviation point.

In an embodiment, the clock switching component is a multiplexer, and a total number of channels of the multiplexer matches a number of clocks included in the clock generating component.

In an embodiment, in response to the clock generating component includes a first clock and a second clock, the clock switching component is a 2:1 clock multiplexer; and the controller is connected to a channel switching control signal pin of the clock switching component;

the controller, configured to input a high level to the channel switching control signal pin to control the first clock to serve as a master clock;

the controller, configured to input a low level to the channel switching control signal pin to control a second clock to serve as a master clock.

In an embodiment, the controller is configured to sample the first clock signal and the second clock signal at a set sampling frequency.

In an embodiment, the controller is configured to acquire accumulated operating time of the current clock, search for a corresponding relationship between operating time and a sampling frequency to determine a target sampling frequency matching the accumulated operating time, and sample the first clock signal and the second clock signal at the target sampling frequency.

A second aspect of examples of the disclosure provides a switching method of a clock circuit. The method includes:

receiving a first clock signal transmitted by a clock switching component;

determining, based on the first clock signal and a second clock signal generated by a reference clock, a frequency offset between a clock generating component and the reference clock; and sending, in response to that the first clock signal and the frequency offset both satisfy set anomaly conditions, a switching signal to the clock switching component, to enable the clock switching component to control the clock generating component to switch a current clock to a standby clock based on the switching signal; wherein the standby clock is any one of all other clocks of the clock generating component except the current clock.

In an embodiment, the determining, based on the first clock signal and a second clock signal generated by a reference clock, a frequency offset between a clock generating component and the reference clock includes:

sampling the first clock signal and the second clock signal to obtain a first digital signal and a second digital signal; and determining, based on the first digital signal and the second digital signal, the frequency offset between the clock generating component and the reference clock.

In an embodiment, the sending, in response to that the first clock signal and the frequency offset both satisfy set anomaly conditions, a switching signal to the clock switching component includes:

judging whether the first digital signal is a constant;

sending, in response to the first digital signal being a constant, the switching signal to the clock switching component;

judging, in response to the first digital signal being not a constant, whether the frequency offset is greater than a standard frequency offset; and sending, in response to the frequency offset being greater than the standard frequency offset, the switching signal to the clock switching component.

In an embodiment, the method further includes:

transmitting, in response to the first digital signal being a constant, to the managing component, fault information indicating that a clock stops oscillating; and transmitting, in response to the first digital signal being not a constant and the frequency offset being greater than the standard frequency offset, fault information indicating that a frequency of a clock is abnormal to the managing component.

In an embodiment, in response to the clock generating component includes two clocks, a first output pin of the controller is connected to a first input pin of the managing component; and a second output pin of the controller is connected to a second input pin of the managing component.

The transmitting, to the managing component, fault information includes:
controlling, in response to the first digital signal of the first clock being a constant or in response to the first digital signal being not a constant and the frequency offset being greater than the standard frequency offset, the first output pin to output a low level, to enable the managing component to display, in response to detecting that the first input pin is at a low level, warning information of a first clock fault.

In an embodiment, the method further includes:
increasing the number of times of clock calling by one every time a switching signal is sent to the clock switching component; wherein the number of times of clock calling is one in an initial state.

Before the sending, in response to the first clock signal and the frequency offset both satisfy set anomaly conditions, a switching signal to the clock switching component, the method further includes:
judging, in response to the first clock signal and the frequency offset both satisfy the set anomaly conditions, whether the number of times of clock calling is less than a total number of clocks included in the clock generating component;
carrying out, in response to the number of times of clock calling being less than the total number of clocks included in the clock generating component, the step of sending a switching signal to the clock switching component; and
transmitting, in response to the number of times of clock calling being greater than or equal to the total number of clocks included in the clock generating component, warning information indicating that a clock is unusable to the managing component.

In an embodiment, the method further includes:
adjusting, in response to receiving a reminder message indicating that a clock is successfully repaired sent by the managing component, the number of times of clock calling based on the number of clocks successfully repaired carried in the reminder message.

In an embodiment, before the determining, based on the first digital signal and the second digital signal, the frequency offset between the clock generating component and the reference clock, the method further includes:
judging whether a data amount of the first digital signal and a data amount of the second digital signal reach quantity thresholds; and
carrying out, in response to the data amount of the first digital signal and the data amount of the second digital signal both reach the quantity thresholds, the step of determining, based on the first digital signal and the second digital signal, the frequency offset between the clock generating component and the reference clock.

In an embodiment, before the determining, based on the first digital signal and the second digital signal, the frequency offset between the clock generating component and the reference clock, the method further includes:
multiplying the first digital signal and the second digital signal together to obtain a mixed signal;
extracting a frequency deviation signal from the mixed signal;
carrying out fast Fourier transform on the frequency deviation signal to determine a frequency deviation point; and
determining, based on the frequency deviation point and a number of sampling points, the frequency offset.

In an embodiment, the extracting a frequency deviation signal from the mixed signal includes:
extracting the frequency deviation signal from the mixed signal by a low filter.

In an embodiment, the carrying out fast Fourier transform on the frequency deviation signal to determine a frequency deviation point includes:
carrying out the fast Fourier transform on the frequency deviation signal, to obtain an impulse function with the number of sampling points as an abscissa and an operation result of the fast Fourier transform as an ordinate; and
taking a number of sampling points corresponding to a maximum operation result as the frequency deviation point.

In an embodiment, in response to the clock generating component includes a first clock and a second clock, the clock switching component is a 2:1 clock multiplexer; the controller is connected to a channel switching control signal pin of the clock switching component.

The sending a switching signal to the clock switching component includes:
inputting a high level to the channel switching control signal pin so as to control the first clock to serve as a master clock;
inputting a low level to the channel switching control signal pin so as to control a second clock to serve as a master clock.

In an embodiment, the sampling the first clock signal and the second clock signal to obtain a first digital signal and a second digital signal includes:
sampling the first clock signal and the second clock signal at a set sampling frequency.

In an embodiment, the sampling the first clock signal and the second clock signal at a set sampling frequency includes:
acquiring accumulated operating time of the current clock;
searching for a corresponding relationship between operating time and a sampling frequency to determine a target sampling frequency matching the accumulated operating time; and
sampling the first clock signal and the second clock signal at the target sampling frequency.

A third aspect of examples of the disclosure provides a switching apparatus of a clock circuit. The apparatus includes: a receiving unit, a determining unit and a switching unit;
the receiving unit, configured to receive a first clock signal transmitted by a clock switching component;
the determining unit, configured to determine, based on the first clock signal and a second clock signal generated by a reference clock, a frequency offset between the clock generating component and the reference clock;
the switching unit, configured to send, in response to that the first clock signal and the frequency offset both satisfy set anomaly conditions, a switching signal to the clock switching component, to enable the clock switching component to control the clock generating component to switch a current clock to a standby clock based on the switching signal; wherein the standby clock is any one of all other clocks of the clock generating component except the current clock.

In an embodiment, the determining unit includes a sampling subunit and a frequency offset determining subunit;

the sampling subunit is configured to sample the first clock signal and the second clock signal to obtain a first digital signal and a second digital signal;

the frequency offset determining subunit is configured to determine, based on the first digital signal and the second digital signal, the frequency offset between the clock generating component and the reference clock.

In an embodiment, the switching unit includes a first determining subunit, a sending subunit and a second determining subunit;

the first determining subunit is configured to judge whether the first digital signal is a constant;

the second determining subunit is configured to judge, in response to the first digital signal being not a constant, whether the frequency offset is greater than a standard frequency offset;

the sending subunit is configured to send, in response to the first digital signal being a constant or the frequency offset being greater than the standard frequency offset, the switching signal to the clock switching component.

In an embodiment, the apparatus further includes a transmitting unit;

the transmitting unit is configured to transmit, in response to the first digital signal being a constant, to the managing component, fault information indicating that a clock stops oscillating, and transmit, in response to the first digital signal being not a constant and the frequency offset being greater than the standard frequency offset, fault information indicating that a frequency of a clock is abnormal to the managing component.

In an embodiment, in response to the clock generating component includes two clocks, a first output pin of the controller is connected to a first input pin of the managing component; a second output pin of the controller is connected to a second input pin of the managing component.

The transmitting unit is configured to control, in response to the first digital signal of the first clock being a constant or in response to the first digital signal being not a constant and the frequency offset being greater than the standard frequency offset, the first output pin to output a low level, to enable the managing component to display, in response to detecting that the first input pin is at a low level, warning information of a first clock fault.

In an embodiment, the apparatus further includes an accumulating unit, a number-of-times determining unit and a warning unit;

the accumulating unit is configured to increase the number of times of clock calling by one every time a switching signal is sent to the clock switching component; the number of times of clock calling is one in an initial state;

the number-of-times determining unit is configured to judge, in response to the first clock signal and the frequency offset both satisfy the set anomaly conditions, before the switching signal is sent to the clock switching component, whether the number of times of clock calling is less than a total number of clocks included in the clock generating component, and trigger, in response to the number of times of clock calling being less than a total number of clocks included in the clock generating component, the sending subunit to carry out the step of sending the switching signal to the clock switching component;

the warning unit is configured to transmit, in response to the number of times of clock calling being greater than or equal to the total number of clocks included in the clock generating component, warning information indicating that a clock is unusable to the managing component.

In an embodiment, the apparatus further includes an adjusting unit;

the adjusting unit is configured to adjust, in response to receiving a reminder message indicating that a clock is successfully repaired sent by the managing component, the number of times of clock calling based on the number of clocks successfully repaired carried in the reminder message.

In an embodiment, the apparatus further includes a quantity determining unit;

the quantity determining unit is configured to judge whether a data amount of the first digital signal and a data amount of the second digital signal reach quantity thresholds, and trigger, in response to the data amount of the first digital signal and the data amount of the second digital signal both reach the quantity thresholds, the frequency offset determining subunit to carry out a step of determining, based on the first digital signal and the second digital signal, the frequency offset between the clock generating component and the reference clock.

In an embodiment, the frequency offset determining subunit is configured to multiply the first digital signal and the second digital signal together to obtain a mixed signal, extract a frequency deviation signal from the mixed signal, carry out fast Fourier transform on the frequency deviation signal to determine a frequency deviation point, and determine, based on the frequency deviation point and a number of sampling points, the frequency offset.

In an embodiment, the frequency offset determining subunit is configured to extract the frequency deviation signal from the mixed signal by a low filter.

In an embodiment, the frequency offset determining subunit is configured to carry out the fast Fourier transform on the frequency deviation signal, to obtain an impulse function with the number of sampling points as an abscissa and an operation result of the fast Fourier transform as an ordinate, and take the number of sampling points corresponding to a maximum operation result as the frequency deviation point.

In an embodiment, in response to the clock generating component includes a first clock and a second clock, the clock switching component is a 2:1 clock multiplexer; the controller is connected to a channel switching control signal pin of the clock switching component.

The sending subunit is configured to input a high level to the channel switching control signal pin to control the first clock to serve as a master clock, or input a low level to the channel switching control signal pin to control a second clock to serve as a master clock.

In an embodiment, the sampling subunit is configured to sample the first clock signal and the second clock signal at a set sampling frequency.

In an embodiment, the sampling subunit is configured to acquire accumulated operating time of the current clock, search for a corresponding relationship between operating time and a sampling frequency to determine a target sampling frequency matching the accumulated operating time, and sample the first clock signal and the second clock signal at the target sampling frequency.

A fourth aspect of examples of the disclosure further provides a non-transitory computer-readable storage medium. The non-transitory computer-readable storage medium stores a computer program. The computer program implements steps of the above switching method of a clock circuit when executed by a processor.

It can be seen from the above solutions that a switching system of a clock circuit includes a clock generating component, a clock switching component and a controller. The clock generating component includes at least two clocks. A reference clock is integrated into the controller. The clock switching component is connected to the clock generating component and the controller, and is configured to collect a first clock signal generated by the clock generating component and transmit the first clock signal to the controller. The controller is configured to receive the first clock signal transmitted by the clock switching component, determine, based on the first clock signal and a second clock signal generated by the reference clock, a frequency offset between the clock generating component and the reference clock. In response to that the first clock signal and the frequency offset both satisfy set anomaly conditions, it is indicated that a current clock in the clock generating component is abnormal. In order to ensure normal operation of the clock generating component, the controller can send a switching signal to the clock switching component. The clock switching component receives the switching signal sent by the controller, and controls, based on the switching signal, the clock generating component to switch the current clock to a standby clock. The standby clock is any one of all other clocks of the clock generating component except the current clock. A beneficial effect of the disclosure is that an operating state of the current clock can be identified by the controller based on the first clock signal and the frequency offset by integrating at least two clocks in the clock generating component. When the current clock is abnormal, the clock switching component can control the clock generating component to switch the current clock to the standby clock. Thus, smooth operation of a system service is ensured, and stability of system operation is improved.

BRIEF DESCRIPTION OF THE DRAWINGS

In order to describe examples of the disclosure more clearly, accompanying drawings required to be used in the examples will be briefly introduced. Apparently, the accompanying drawings in the following descriptions are merely some examples of the disclosure. Those of ordinary skill in the art can obtain other accompanying drawings according to these accompanying drawings without making creative efforts.

DETAILED DESCRIPTION OF THE EMBODIMENTS

Solutions of embodiments of the disclosure will be clearly and completely described in combination with accompanying drawings of the embodiments of the disclosure. Apparently, the embodiments described are merely some embodiments rather than all embodiments of the disclosure. Based on embodiments of the disclosure, all other embodiments obtained by those of ordinary skill in the art without making creative efforts fall within the scope of protection of the disclosure.

The terms "include", "have" and their related variations in the description and claims of the disclosure and in the above accompanying drawings are intended to cover non-exclusive inclusions. For instance, a process, method, system, product or device that includes a series of steps or units is not limited to the listed steps or units, but may include a step or unit that is not listed.

In order to enable those skilled in the art to better understand the solutions of the disclosure, the disclosure will be described in detail below in combination with accompanying drawings and optional embodiments.

Figure 1:
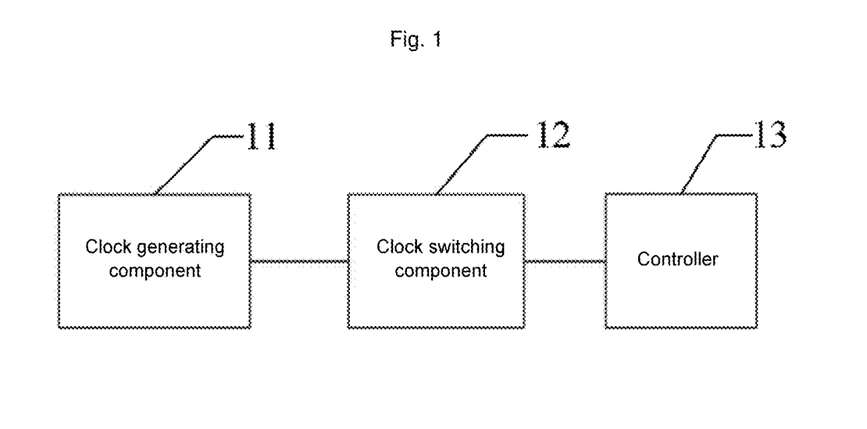
FIG. 1 is a schematic structural diagram of a switching system of a clock circuit according to an embodiment of the disclosure.

A switching system of a clock circuit provided in an example of the disclosure will be introduced in detail next. FIG. 1 is a schematic structural diagram of a switching system of a clock circuit according to an embodiment of the disclosure. The switching system includes a clock generating component 11, a clock switching component 12 and a controller 13. The clock generating component 11 includes at least two clocks. A reference clock is integrated into the controller 13.

The switching system of a clock circuit provided in an embodiment of the disclosure may be applied to a switch product, or a high-density network hardware device such as a server and a network card. For convenience of description, the server is taken as an instance for introduction.

In order to ensure stability of server operation, the clock generating component 11 may include at least two clocks. When a current clock is abnormal, another clock can replace the current clock to operate. Thus, a service of the server can be ensured to be uninterrupted.

Since the clock generating component 11 includes at least two clocks, and only one clock is required to be selected as a master clock during actual operation of the server, a clock signal is required to be selected by the clock switching component 12. A multiplexer (MUX) may be used as the clock switching component 12. A total number of channels of the multiplexer may match a number of clocks included in the clock generating component 11. For instance, in response to the clock generating component 11 includes two clocks, a 2:1 clock multiplexer, that is, a 2:1 MUX may be used as the multiplexer. In response to the clock generating component 11 includes four clocks, a 4:1 clock multiplexer, that is, a 4:1 MUX may be used as the multiplexer.

During normal operation of the server, a default clock of the clock generating component 11 may be used as the master clock. The master clock is in an operating state. Other clocks are used as standby clocks in non-operating states.

For convenience of description, a clock currently in an operating state may be referred to as a master clock.

In order to detect whether the operating state of the master clock is normal, the reference clock is integrated into the controller 13. When the master clock is in a normal operating state, a clock signal generated by the master clock and a clock signal generated by the reference clock are the same or almost the same. Once a large deviation exists between the clock signal generated by the master clock and the clock signal generated by the reference clock, it is indicated that the master clock is abnormal.

In order to distinguish between different clock signals, a clock signal corresponding to the master clock may be referred to as a first clock signal. A clock signal corresponding to the reference clock may be referred to as a second clock signal.

The clock switching component 12 is connected to the clock generating component 11 and the controller 13, and is configured to collect the first clock signal generated by the clock generating component 11 and transmit the first clock signal to the controller 13.

The controller 13 is configured to receive the first clock signal transmitted by the clock switching component 12, and determine, based on the first clock signal and the second clock signal generated by the reference clock, a frequency offset between the clock generating component 11 and the reference clock. In response to that the first clock signal and the frequency offset both satisfy set anomaly conditions, it is indicated that a current clock is abnormal. The controller 13 may send the switching signal to the clock switching component 12.

The clock switching component 12 receives the switching signal sent by the controller 13, and controls, based on the switching signal, the clock generating component 11 to switch the current clock to a standby clock. The standby clock is any one of all other clocks in the clock generating component 11 except the current clock.

During practical application, a field programmable gate array (FPGA) may be used as the controller 13.

In order to analyze a clock signal, the controller 13 may sample the first clock signal and the second clock signal to obtain a first digital signal and a second digital signal, and determine, based on the first digital signal and the second digital signal, the frequency offset between the clock generating component 11 and the reference clock.

The first digital signal may be configured to reflect an operating state of the master clock.

When the master clock is in a normal operating state, a clock waveform is a sine wave. When the first digital signal does not change, it is indicated that the clock waveform is not the sine wave. That is, the clock signal presents as a straight line, and hardware deems that the clock stops oscillating. When the first digital signal significantly changes, it is indicated that the clock oscillates along the sine wave. A common problem in this case is an excessive frequency deviation.

Thus, during practical application, the controller 13 may judge whether the first digital signal is a constant. A constant is a number that does not change. In response to the first digital signal being a constant, it is indicated that a master clock stops oscillating. The controller 13 may send a switching signal to the clock switching component 12.

In response to the first digital signal being not a constant, the controller 13 may judge whether the frequency offset is greater than a standard frequency offset.

The frequency offset represents a frequency deviation between the clock signal generated by the master clock and the clock signal generated by the reference clock. A nominal frequency offset in the Crystal Specification Sheet may be used as the standard frequency offset.

In response to the frequency offset being greater than the standard frequency offset, it is indicated that a frequency of the master clock is abnormal, that is, falls beyond a range. The controller 13 may send the switching signal to the clock switching component 12.

Figure 2:
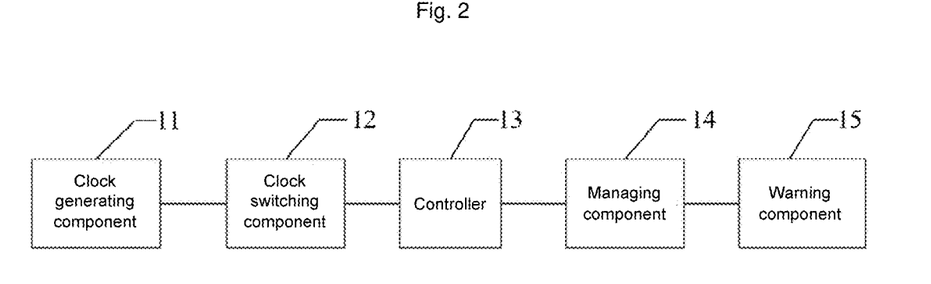
FIG. 2 is a schematic structural diagram of a switching system of a clock circuit in which a warning method is set according to an embodiment of the disclosure.

When the master clock is abnormal, an abnormal component of the master clock is generally required to be manually replaced. Thus, in order to enable staff to timely discover a situation that a clock is abnormal, a managing component 14 may be arranged.

In an embodiment of the disclosure, the controller 13 is connected to the managing component 14, and is configured to transmit, in response to the first digital signal being a constant, to the managing component 14, fault information indicating that a clock stops oscillating, and transmit, in response to the first digital signal being not a constant and the frequency offset being greater than the standard frequency offset, to the managing component 14, fault information indicating that a frequency of a clock is abnormal.

The managing component 14 may display fault information through a human-computer interaction interface, to allow staff to detect a situation that a clock is abnormal.

A baseboard management controller (BMC) may be used as the managing component 14.

Considering that the clock generating component 11 may include a plurality of clocks, in order to enable the managing component 14 to learn which clock is abnormal, the number of pins of the controller 13 connected to the managing component 14 may be set to be the same as the number of clocks included in the clock generating component 11. One connection pin corresponds to one clock.

During practical application, the controller 13 may input a high level to a pin connected to the managing component 14, and it is indicated that a clock corresponding to the pin is normal. The controller 13 may input a low level to a pin connected to the managing component 14, and it is indicated that a clock corresponding to the pin is abnormal.

With an instance in which the clock generating component 11 includes two clocks, the two clocks may be referred to as a first clock and a second clock. A first output pin of the controller 13 is connected to a first input pin of the managing component 14. A second output pin of the controller 13 is connected to a second input pin of the managing component 14. The first clock may correspond to the first output pin of the controller 13 and the first input pin of the managing component 14. The second clock may correspond to the second output pin of the controller 13 and the second input pin of the managing component 14.

Assuming that the master clock is the first clock, the controller 13 is configured to control, in response to the first digital signal of the first clock being a constant or in response to the first digital signal being not a constant and the frequency offset being greater than the standard frequency offset, the first output pin to output a low level. The managing component 14 is configured to display, in response to detecting that the first input pin is at a low level, warning information of a first clock fault.

In an embodiment of the disclosure, in order to improve a warning effect when a clock is abnormal, the managing component 14 may be connected to a warning component 15. The managing component 14 controls, in response to receiving fault information transmitted by the controller 13, the warning component 15 to enable a warning mode matching a type of the fault information.

The warning component 15 may be an indicator light arranged on a front panel of a device.

The managing component 14 controls, in response to receiving the fault information indicating that a clock stops oscillating transmitted by the controller 13, the warning component 15 to switch an indicator light corresponding to the current clock to a red light, and controls, in response to receiving the fault information indicating that a frequency of a clock is abnormal transmitted by the controller 13, the warning component 15 to switch an indicator light corresponding to the current clock to a yellow light.

A color setting of the indicator light can be flexibly adjusted, as long as the staff knows in advance what a light of each color means.

During practical application, the number of groups of indicator lights arranged on the front panel of the device is the same as the number of clocks included in the clock generating component 11. The number of indicator lights in each group may be determined based on a type of an indicator light and a state of a clock.

In response to a color-changing indicator light being used as the indicator light, one indicator light may be included in each group. A color of the indicator light may be adjusted based on a change of a clock state.

A single-color indicator light may be set as the indicator light. In order to represent a normal state and an abnormal state of a clock, two indicator lights may be arranged for one clock. One indicator light may be a red light configured to represent the abnormal state of the clock. The other indicator light may be a green light configured to represent the normal state of the clock.

Certainly, moreover, the abnormal state of the clock may include two situations: a clock stops oscillating or a frequency of a clock is abnormal. Thus, in response to an abnormal state of a clock, two indicator lights may be arranged. In this case, one clock may correspond to three indicator lights. One indicator light may be a red light configured to represent that a clock stops oscillating. One indicator light may be a yellow light configured to represent that a frequency of a clock is abnormal. Another indicator light may be a green light configured to represent that a clock is normal.

By arranging an indicator light on the front panel of the device, the staff can be effectively reminded of a fault situation of a clock. Thus, the staff can timely handle a fault of the clock.

In an embodiment of the disclosure, the managing component 14 may display, in response to receiving fault information transmitted by the controller 13, the fault information through a human-computer interaction interface.

FIG. 2 is a schematic structural diagram of a switching system of a clock circuit in which a warning method is set according to an embodiment of the disclosure. The switching system includes a clock generating component 11, a clock switching component 12, a controller 13, a managing component 14 and a warning component 15. The clock generating component 11 may generate a clock signal. The controller 13 may detect an operating state of a current clock, and control, when the current clock is abnormal, the clock switching component 12 to implement clock switching in the clock generating component 11. The controller 13 may transmit warning information to the managing component 14 in response to detecting that the current clock is abnormal. The managing component 14 may control the warning component 15 to enable a warning mode matching a type of fault information.

In response to the clock generating component 11 includes a plurality of clocks, when the current clock is abnormal, a clock that is not called previously may be switched to the master clock. Considering that during practical application, a clock that is abnormal previously may be not timely replaced, and the current clock may be abnormal. In this case, in response to the current clock is switched to the clock that is abnormal previously, a clock still cannot normally operate. As a result, a system service will be interrupted.

In this case, the controller 13 may increase the number of times of clock calling by one every time a switching signal is sent to the clock switching component 12. The number of times of clock calling is one in an initial state.

In response to that the first clock signal and the frequency offset both satisfy the set anomaly conditions, the controller 13 may first judge whether the number of times of clock calling is less than a total number of clocks included in the clock generating component.

In response to the number of times of clock calling being less than the total number of clocks included in the clock generating component, it is indicated that the clock generating component 11 still includes a normal clock that is not called. A switching signal may be sent to the clock switching component 12.

In response to the number of times of clock calling being greater than or equal to the total number of clocks included in the clock generating component, it is indicated that all other clocks in the clock generating component 11 except the current clock are called. All the called clocks may be still not replaced after a fault occurs. Warning information indicating that a clock is unusable may be transmitted to the managing component 14. Thus, the staff can timely detect an operating situation of each clock in the clock generating component 11, and timely replace a faulty clock.

In an embodiment of the disclosure, by counting the number of times of clock calling, the controller 13 can timely learn a calling situation of each clock in the clock generating component 11. The number of faulty clocks in the clock generating component 11 can be reflected based on the number of times of clock calling. Warning information can be timely transmitted to the managing component 14 after all clocks are called. Thus, the staff can timely replace the faulty clocks, and an impact of all faulty clocks on system operation can be reduced.

During practical application, after the staff replaces the clock, a reminder message indicating that a clock is successfully repaired may be inputted through the human-computer interaction interface of the managing component 14. In this case, the managing component 14 may send the reminder message to the controller 13. The controller 13 may adjust, in response to receiving a reminder message indicating that a clock is successfully repaired sent by the managing component 14, the number of times of clock calling based on the number of clocks successfully repaired carried in the reminder message.

For instance, it is assumed that the clock generating component 11 includes 4 clocks, that is, clock a, clock b, clock c and clock d. In an initial state, clock a operates as a master clock, and the number of times of clock calling is 1. When failing, clock a can be switched to clock b to operate as a master clock. At this time, the number of times of calling is 2. By analogy, when failing, clock b can be switched to clock c to operate as a master clock. At this time, the number of times of calling is 3. When failing, clock c can be switched to clock d to operate as a master clock. At this time, the number of times of calling is 4. When clock d fails, the number of times of calling, which is 4, is equal to a total number of clocks, which is 4. Since whether clocks previously called are repaired is not determined, the controller 13 may transmit, to the managing component 14, warning information indicating that a clock is unusable. Thus, the staff can timely detect an operating situation of each clock in the clock generating component 11, and timely replace a faulty clock.

When the staff replaces the faulty clock, that is, the clock is successfully repaired, the staff may input, through the human-computer interaction interface of the managing component 14, a reminder message indicating that a clock is successfully repaired. Assuming that the staff replaces clock a, clock b and clock c, the number of clocks successfully repaired is 3. In this case, the number of times of clock calling can be reduced by 3. Assuming that the number of times of clock calling is 4, the adjusted number of times of clock calling is 1.

During practical application, the controller 13 may transmit, in response to the number of times of clock calling being greater than 1 or greater than a set threshold, a reminder message of clock modification to the managing component 14 such that the staff can timely replace a faulty clock. Thus, it is effectively ensured that there is always a usable clock in the clock generating component 11, and a system service is uninterrupted.

In an embodiment of the disclosure, in order to evaluate an operating state of the current clock, the controller 13 may sample the first clock signal generated by the current clock, sample the second clock signal generated by the reference clock, and compare discretized digital signals after sampling such that whether the current clock normally operates can be determined. In order to distinguish between different digital signals, a digital signal corresponding to the first clock signal may be referred to as a first digital signal. A digital signal corresponding to the second clock signal may be referred to as a second digital signal.

In an embodiment of the disclosure, an FPGA may be used as the controller 13. A clock frequency detector (CFD) may be integrated into the FPGA. An anomaly of the current clock may be detected by the CFD. During practical application, the FPGA may store the first digital signal and the second digital signal obtained through sampling in a data register. For instance, the first digital signal may be stored in DATA1, and the second digital signal may be stored in DATA0. The CFD may read a digital signal from the data register for an analysis.

During practical application, the controller 13 may sample the first clock signal and the second clock signal at a set sampling frequency.

In an embodiment of the disclosure, the controller 13 may acquire accumulated operating time of the current clock, search for a corresponding relationship between operating time and a sampling frequency to determine a target sampling frequency matching the accumulated operating time, and sample the first clock signal and the second clock signal at the target sampling frequency.

In the corresponding relationship between the operating time and the sampling frequency, the longer operating time is, the higher a corresponding sampling frequency is.

As operating time of the current clock increases, a probability that the current clock is abnormal gradually increases. Thus, in response to operating time of the current clock is long, the sampling frequency of the clock signal can be increased. The operating state of the current clock can be evaluated in a shorter time. Timeliness of detecting an abnormal state of the clock can be improved.

When a data amount of the digital signal is small, an accuracy rate of evaluating the operating state of the clock based on the digital signal is low. Thus, in an embodiment of the disclosure, in order to accurately evaluate the operating state of the current clock, a quantity threshold may be set for evaluating a data amount of a digital signal used.

The controller 13 may judge whether a data amount of the first digital signal and a data amount of the second digital signal reach quantity thresholds.

In response to the data amount of the first digital signal and the data amount of the second digital signal both reach the quantity thresholds, a step of determining, based on the first digital signal and the second digital signal, the frequency offset between the clock generating component 11 and the reference clock may be carried out.

During implementation, the controller 13 may multiply the first digital signal and the second digital signal together to obtain a mixed signal, extract a frequency deviation signal from the mixed signal, carry out fast Fourier transform on the frequency deviation signal to determine a frequency deviation point, and determine, based on the frequency deviation point and a number of sampling points, the frequency offset.

The mixed signal includes a high frequency component and a frequency deviation signal. During practical application, the controller 13 may extract the frequency deviation signal from the mixed signal by a low filter.

When the fast Fourier transform is carried out on the frequency deviation signal, a number of sampling points may be taken as an abscissa, and an operation result of the fast Fourier transform may be taken as an ordinate. Thus, an impulse function with the number of sampling points as an abscissa and an operation result of the fast Fourier transform as an ordinate can be obtained.

A maximum value of the impulse function corresponds to a frequency deviation point. Thus, a number of sampling points corresponding to a maximum operation result can be taken as the frequency deviation point.

For instance, a discretization expression of the first digital signal is $T_1(n)=\sin(w_1 n+\varphi)$, a discretization expression of the second digital signal is $T_0(n)=\sin(w_0 n+\varphi)$, $T_1(n)$ represents the first digital signal, $T_0(n)$ represents the second digital signal, $w_1$ represents an angular velocity corresponding to the current clock, $w_0$ represents an angular velocity corresponding to the reference clock, n represents the number of sampling points, and $\varphi$ represents a phase shift, and is a fixed parameter.

By multiplying $T_1(n)$ and $T_0(n)$, a mixed signal including two frequency components can be obtained, that is, $T_2(n)=\cos(w_1-w_0)n-\cos(w_1+w_0)$. In an embodiment, $T_2(n)$ represents the mixed signal, $\cos(w_1-w_0)n$ represents a component including a frequency deviation, that is, a frequency deviation signal, and $\cos(w_1+w_0)$ represents a high frequency component.

An objective of evaluating the operating state of the current clock is to obtain a component of a frequency deviation. Thus, frequency deviation signal $\cos(w_1-w_0)n$ can be obtained after $T_2(n)$ is processed by a low filter (LF). During practical application, the frequency deviation signal may be stored in a data register DATA3 for subsequent calling.

The frequency deviation between the current clock and the reference clock can be obtained by carrying out the fast Fourier transform (FFT) and maximum value operation on $\cos(w_1-w_0)n$. Since DATA3 is a sine function, an impulse function will be obtained after the FFT. The impulse function takes the number of sampling points as the abscissa and the operation result of the FFT as the ordinate. An abscissa point corresponding to a maximum value on a vertical axis of the function after the maximum value operation is $n_1$. In an embodiment, $n_1$ is the frequency deviation point.

Assuming that the number of sampling points is n, a sampling frequency of the FPGA is $f_0$, and the frequency deviation point is $n_1$, frequency deviation $\Delta f$ between the current clock and the reference clock can be computed by using $\Delta f = n_1 * f_0/n$. That is, a frequency offset of the current clock is $\Delta p = \Delta f/f_0 = n_1/n$.

After the frequency offset is determined, whether the first clock signal and the frequency offset both satisfy the set anomaly conditions can be judged. The anomaly conditions may include a condition that a value of the first digital signal is a constant and a condition that a frequency offset is greater than a standard frequency offset. A constant refer to data of which a value does not change.

In response to $T_1(n)$ is a constant, it is indicated that the current clock stops oscillating. In response to $T_1(n)$ is not a constant, $\Delta p > \Delta p_1$, and $\Delta p_1$ represents the standard frequency offset, it is indicated that the frequency offset of the current clock falls beyond a range. That is, a frequency of the current clock is abnormal.

In an embodiment of the disclosure, a total number of channels of the multiplexer matches a number of clocks included in the clock generating component 11. In response to the clock generating component 11 includes a first clock and a second clock, a 2:1 clock multiplexer may be used as the clock switching component 12.

The controller 13 is connected to a channel switching control signal pin of the clock switching component 12. The controller 13 is configured to input a high level to the channel switching control signal pin to control the first clock to serve as a master clock, or input a low level to the channel switching control signal pin to control a second clock to serve as a master clock.

Figure 3:
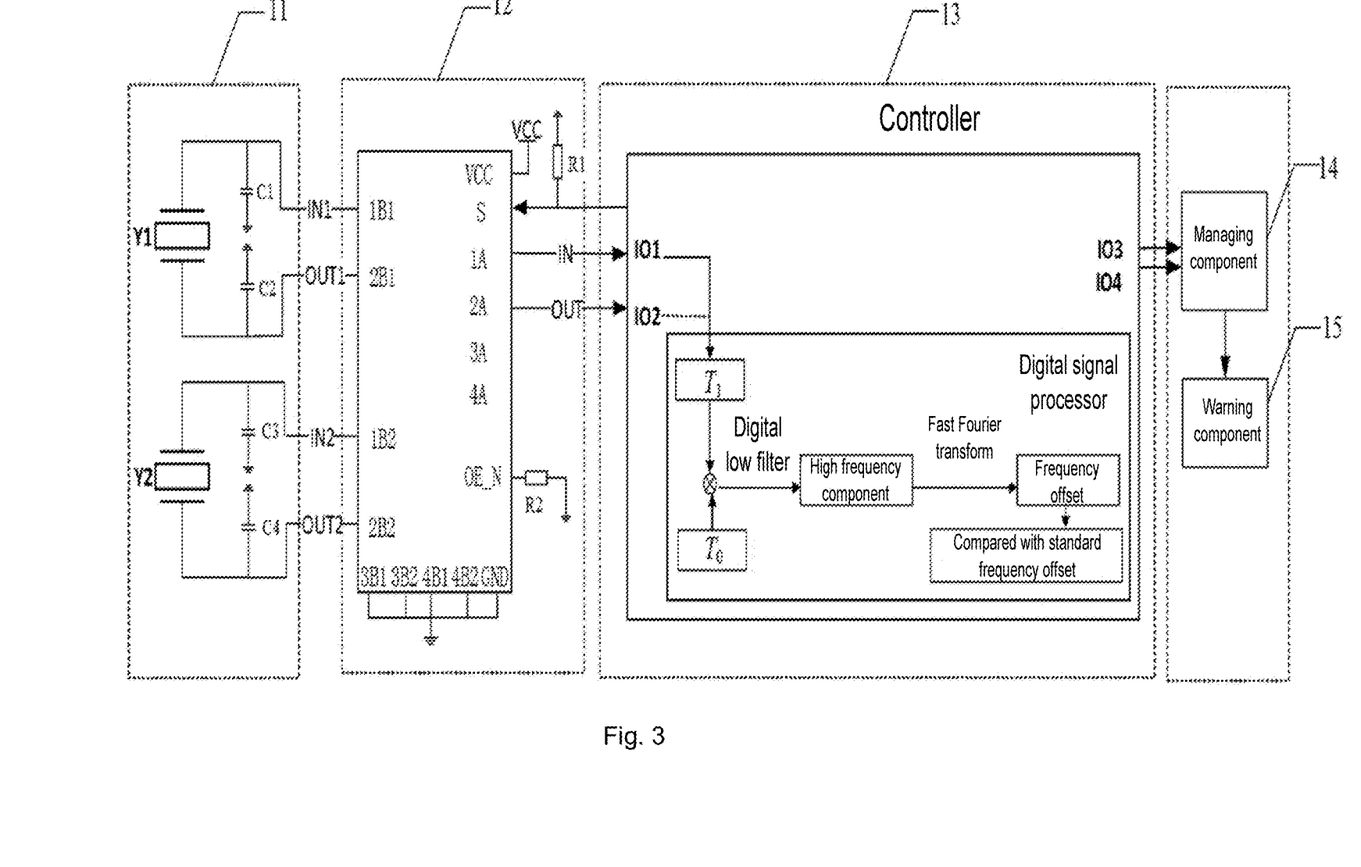
FIG. 3 is a diagram of a fault redundancy switching circuit based on a clock circuit according to an embodiment of the disclosure.

FIG. 3 is a diagram of a fault redundancy switching circuit based on a clock circuit according to an embodiment of the disclosure. In FIG. 3, a circuit diagram of a clock generating component 11, a circuit diagram of a clock switching component 12, a circuit diagram of a controller 13, and a managing component 14 and a warning component 15 connected to the controller 13 are sequentially provided from left to right. In FIG. 3, an instance in which a baseboard management controller is used as the managing component 14, a light-emitting diode (LED) is used as the warning component 15 for light warning is taken.

In FIG. 3, an instance in which the clock generating component 11 includes two clocks is taken. A clock circuit on an upper side may be referred to as a master clock. A clock circuit on a lower side may be referred to as a standby clock. Master clock and standby clock generating circuits are implemented by combinations of crystals and load capacitors. In an embodiment, Y1 is a crystal (a master crystal) of a master clock, C1 and C2 are load capacitors of the master clock, Y2 is a crystal (a standby crystal) of a standby clock, and C3 and C4 are load capacitors of the standby clock. The main crystal and the standby crystal will generate clock signals under the action of the external load capacitors and are connected to the controller 13 by means of the clock switching component 12. Master clock signals are marked as input 1 (IN1) and output 1 (OUT1). Standby clock signals are marked as IN2 and OUT2.

The clock switching component 12 may be implemented by a 2:1 MUX. Further, 74CBTLV3257PW may be used as the 2:1 MUX. Table 1 shows signal descriptions of pins in the clock switching component. When a system power source normally supplies power, in a default state, S and OE_N are impacted by R1 and R2, S is at a low level (S=0), and OUT=IN1 (IN=IN1, OUT=OUT1). That is, a master clock circuit is connected to the controller 13. In response to the master clock being abnormal, S is at a high level (S=1), and OUT=IN2 (IN=IN2, OUT=OUT2). That is, a standby clock circuit is connected to the controller 13. The controller 13 can implement circuit switching of master and standby clocks by controlling high and low levels of S.

TABLE 1

Signal descriptions of pins in clock switching component

| Signal name | Signal | Notes |
| --- | --- | --- |
| Input signal 1 (IN1/OUT1) | 1B1/2B1/3B1/4B1 | Input signal of master clock |
| Input signal 2 (IN2/OUT2) | 1B2/2B2/3B2/4B2 | Input signal of standby clock |
| Channel switching control signal | S | Low level: 1A = 1B1 2A = 2B1 3A = 3B1 4A = 4B1 High level: 1A = 1B2 2A = 2B2 3A = 3B2 4A = 4B2 |
| Output signal (OUT) | 1A/2A/3A/4A | |
| Output enable control | OE_N | A low level is active (a channel can be normally switched). |
| Power source | VCC/GND | Used for supplying power to a chip |

In FIG. 3, an instance in which an FPGA is used as the controller 13 is taken. A digital signal processor (DSP) is integrated into the FPGA. The digital signal processor detects an operating state of the master clock based on a digital low filter (LF) and fast Fourier transform (FFT). A mixed signal including two frequency components can be obtained by multiplying T1 and T0 together. A high frequency component can be obtained by the LF. Then the frequency deviation between the current clock and the reference clock can be obtained through the FFT and maximum value operation. By comparing the frequency deviation with the standard frequency offset, whether the clock is abnormal can be determined.

Fault information can be reported to the FPGA by the internal DSP and stored in an internal register of the FPGA. When a program computation result determines that the master clock is abnormal (a frequency of the master clock is abnormal/the master clock stops oscillating), anomaly information is reported to the FPGA for anomaly handling. Otherwise, the program repeatedly runs to detect the master clock in real time.

In response to the FPGA receives information indicating that the master clock is abnormal, the FPGA controls S to output a high level (S=1), to start a standby clock circuit. In this case, the DSP in the FPGA starts to re-detect a frequency of a standby clock. Moreover, the FPGA transmits the detected fault information to the managing component 14 by signals (IO_3 and IO_4). In an embodiment, IO_3 and IO_4 are fault signals of a master clock and a standby clock respectively, and IO_3=IO_4=1 in a default state.

A BMC may be used as the managing component 14. The BMC detects level states of IO_3 and IO_4 transmitted by the FPGA in real time, outputs, based on the level states, fault information through a human-computer interaction interface, and transmits a signal to control the warning component 15.

Fault information is defined as follows: (1) in a normal state: IO_3=1 and IO_4=1. (2) In response to a master clock being abnormal: IO_3=0 and IO_4=1. (3) In response to a standby clock being abnormal: IO_3=1 and IO_4=0. (4) In response to a master clock and a standby clock being abnormal: IO_3=0 and IO_4=0.

The warning component 15 may be an LED light arranged on a front panel of a device. The managing component 14 reminds, by lighting an LED on the front panel, field staff of handling a fault. Different LED colors correspond to fault information as follows: (1) in a normal state: a main clock is a green LED light, and a standby clock is a green LED light. (2) In response to a master clock being abnormal: a main clock is a red LED light, and a standby clock is a green LED light. (3) In response to a standby clock being abnormal: a main clock is a green LED light, and a standby clock is a red LED light. (4) In response to a master clock and a standby clock being abnormal: a main clock is a red LED light, and a standby clock is a red LED light.

Through a fault redundancy circuit design of the clock circuit, when the clock circuit fails, uninterrupted operation of a system service can be ensured. Moreover, based on visual fault information, rapid troubleshooting and fault positioning can be implemented.

It can be seen from the above technical solutions that a switching system of a clock circuit includes a clock generating component, a clock switching component and a controller. The clock generating component includes at least two clocks. A reference clock is integrated into the controller. The clock switching component is connected to the clock generating component and the controller, and is configured to collect a first clock signal generated by the clock generating component and transmit the first clock signal to the controller. The controller is configured to receive the first clock signal transmitted by the clock switching component, and the controller is configured to determine, based on the first clock signal and a second clock signal generated by the reference clock, a frequency offset between the clock generating component and the reference clock. In response to that the first clock signal and the frequency offset both satisfy set anomaly conditions, it is indicated that a current clock in the clock generating component is abnormal. In order to ensure normal operation of the clock generating component, the controller can send a switching signal to the clock switching component. The clock switching component receives the switching signal sent by the controller, and controls, based on the switching signal, the clock generating component to switch the current clock to a standby clock. The standby clock is any one of all other clocks of the clock generating component except the current clock. A beneficial effect of the disclosure is that an operating state of the current clock can be identified by the controller based on the first clock signal and the frequency offset by arranging at least two clocks in the clock generating component. When the current clock is abnormal, the clock switching component can control the clock generating component to switch the current clock to the standby clock. Thus, smooth operation of a system service is ensured, and stability of system operation is improved.

Figure 4:
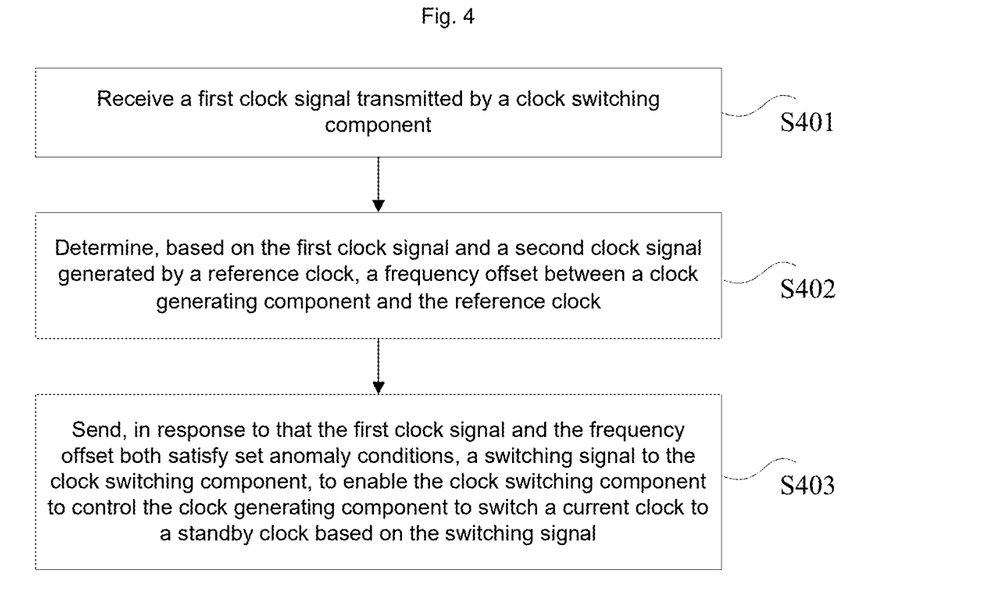
FIG. 4 is a flowchart of a switching method of a clock circuit according to an embodiment of the disclosure.

FIG. 4 is a flowchart of a switching method of a clock circuit according to an embodiment of the disclosure. The method includes:

S401: receiving a first clock signal transmitted by a clock switching component.

The clock generating component may include at least two clocks. When a current clock is abnormal, another clock can replace the current clock to operate. Thus, a service of a server can be ensured to be uninterrupted. The clock switching component is configured to select a clock signal.

The first clock signal refers to a clock signal generated by a clock currently operating. In an initial state, a clock may be selected as a master clock. The master clock serves as a clock currently operating. Other clocks serve as standby clocks in standby states.

S402: determining, based on the first clock signal and a second clock signal generated by a reference clock, a frequency offset between a clock generating component and the reference clock.

A clock may be integrated into the controller and referred to as a reference clock. An operating state of the clock currently operating can be evaluated by the reference clock.

S403: sending, in response to that the first clock signal and the frequency offset both satisfy set anomaly conditions, a switching signal to the clock switching component, to enable the clock switching component to control the clock generating component to switch a current clock to a standby clock based on the switching signal.

The standby clock is any one of all other clocks of the clock generating component except the current clock.

In some embodiments, determining, based on the first clock signal and a second clock signal generated by a reference clock, a frequency offset between a clock generating component and the reference clock includes:
  the first clock signal and the second clock signal are sampled to obtain a first digital signal and a second digital signal; and
  based on the first digital signal and the second digital signal, the frequency offset between the clock generating component and the reference clock is determined.

In some embodiments, in response to the first clock signal and the frequency offset both satisfy set anomaly conditions, a switching signal is sent to the clock switching component includes:
  whether the first digital signal is a constant is judged;
  in response to the first digital signal being a constant, the switching signal is sent to the clock switching component;
  in response to the first digital signal being not a constant, whether the frequency offset is greater than a standard frequency offset is judged; and
  in response to the frequency offset being greater than the standard frequency offset, the switching signal is sent to the clock switching component.

In some embodiments, the method further includes:
  in response to the first digital signal being a constant, fault information indicating that a clock stops oscillating is transmitted to the managing component; and
  in response to the first digital signal being not a constant and the frequency offset being greater than the standard frequency offset, fault information indicating that a frequency of a clock is abnormal is transmitted to the managing component.

In some embodiments, in response to the clock generating component includes two clocks, a first output pin of the controller is connected to a first input pin of the managing component. A second output pin of the controller is connected to a second input pin of the managing component.

The step that fault information is transmitted to the managing component includes:
  in response to the first digital signal of the first clock being a constant or in response to the first digital signal being not a constant and the frequency offset being greater than the standard frequency offset, the first output pin is controlled to output a low level, to enable the managing component to display, in response to detecting that the first input pin is at a low level, warning information of a first clock fault.

In some embodiments, the method further includes:

the number of times of clock calling is increased by one every time a switching signal is sent to the clock switching component. The number of times of clock calling is one in an initial state.

Before a switching signal is sent to the clock switching component, in response to the first clock signal and the frequency offset both satisfy set anomaly conditions, the method further includes:

in response to the first clock signal and the frequency offset both satisfy the set anomaly conditions, whether the number of times of clock calling is less than a total number of clocks included in the clock generating component is judged;

in response to the number of times of clock calling being less than the total number of clocks included in the clock generating component, the step that a switching signal is sent to the clock switching component is carried out; and in response to the number of times of clock calling being greater than or equal to the total number of clocks included in the clock generating component, warning information indicating that a clock is unusable is transmitted to the managing component.

In some embodiments, the method further includes:

in response to receiving a reminder message indicating that a clock is successfully repaired sent by the managing component, the number of times of clock calling based on the number of clocks successfully repaired carried in the reminder message is adjusted.

In some embodiments, before the frequency offset between the clock generating component and the reference clock is determined based on the first digital signal and the second digital signal, the method further includes:

whether a data amount of the first digital signal and a data amount of the second digital signal reach quantity thresholds is judged; and in response to the data amount of the first digital signal and the data amount of the second digital signal both reach the quantity thresholds, the step that based on the first digital signal and the second digital signal, the frequency offset between the clock generating component and the reference clock is determined is carried out.

In some embodiments, based on the first digital signal and the second digital signal, the frequency offset between the clock generating component and the reference clock is determined includes:

the first digital signal and the second digital signal are multiplied together to obtain a mixed signal;

a frequency deviation signal is extracted from the mixed signal;

fast Fourier transform is carried out on the frequency deviation signal to determine a frequency deviation point; and based on the frequency deviation point and a number of sampling points, the frequency offset is determined.

In some embodiments, a frequency deviation signal is extracted from the mixed signal includes:

the frequency deviation signal is extracted from the mixed signal by a low filter.

In some embodiments, fast Fourier transform is carried out on the frequency deviation signal to determine a frequency deviation point includes:

the fast Fourier transform is carried out on the frequency deviation signal, and an impulse function with the number of sampling points as an abscissa and an operation result of the fast Fourier transform as an ordinate is obtained; and a number of sampling points corresponding to a maximum operation result is taken as the frequency deviation point.

In some embodiments, in response to the clock generating component includes a first clock and a second clock, the clock switching component is a 2:1 clock multiplexer. The controller is connected to a channel switching control signal pin of the clock switching component.

A switching signal is sent to the clock switching component includes:

a high level is inputted to the channel switching control signal pin to control the first clock to serve as a master clock; or a low level is inputted to the channel switching control signal pin to control a second clock to serve as a master clock.

In some embodiments, the first clock signal and the second clock signal are sampled to obtain a first digital signal and a second digital signal includes:

the first clock signal and the second clock signal are sampled at a set sampling frequency.

In some embodiments, the first clock signal and the second clock signal are sampled at a set sampling frequency includes:

accumulated operating time of the current clock is acquired;

a corresponding relationship between operating time and a sampling frequency is searched for to determine a target sampling frequency matching the accumulated operating time; and the first clock signal and the second clock signal are sampled at the target sampling frequency.

The descriptions of the features in the embodiment corresponding to FIG. 4 can be obtained with reference to the related descriptions of the embodiment corresponding to FIG. 1, and will not be repeated herein.

It can be seen from the above solutions that a controller receives a first clock signal transmitted by a clock switching component. Based on the first clock signal and a second clock signal generated by a reference clock, a frequency offset between a clock generating component and the reference clock is determined. In response to the first clock signal and the frequency offset both satisfy set anomaly conditions, it is indicated that a current clock in the clock generating component is abnormal. In order to ensure normal operation of the clock generating component, the controller may send a switching signal to the clock switching component, such that the clock switching component controls, based on the switching signal, the clock generating component to switch a current clock to a standby clock. A beneficial effect of the disclosure is that an operating state of the current clock can be identified by the controller based on the first clock signal and the frequency offset by arranging at least two clocks in the clock generating component. When the current clock is abnormal, the clock switching component can control the clock generating component to switch the current clock to the standby clock. Thus, smooth operation of a system service is ensured, and stability of system operation is improved.

Figure 5:
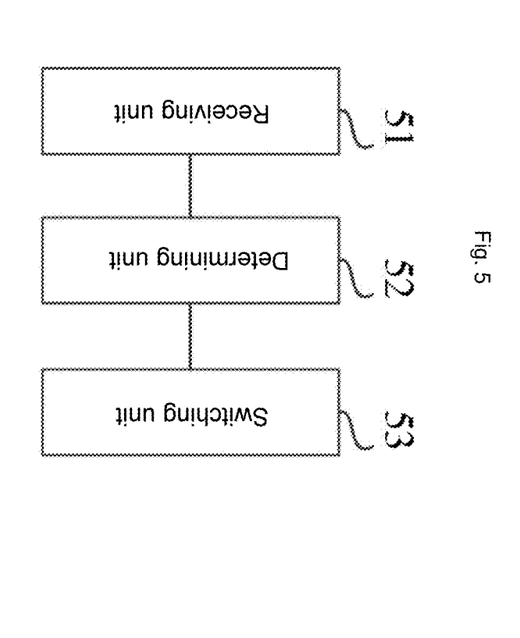
FIG. 5 is a schematic structural diagram of a switching apparatus of a clock circuit according to an embodiment of the disclosure.

FIG. 5 is a schematic structural diagram of a switching apparatus of a clock circuit according to an embodiment of the disclosure. The apparatus includes a receiving unit 51, a determining unit 52 and a switching unit 53.

The receiving unit 51 is configured to receive a first clock signal transmitted by a clock switching component.

The determining unit 52 is configured to determine, based on the first clock signal and a second clock signal generated by a reference clock, a frequency offset between the clock generating component and the reference clock.

The switching unit 53 is configured to send, in response to that the first clock signal and the frequency offset both satisfy set anomaly conditions, a switching signal to the clock switching component, to enable the clock switching component to control, based on the switching signal, the clock generating component to switch a current clock to a standby clock. The standby clock is any one of all other clocks of the clock generating component except the current clock.

In some embodiments, the determining unit includes a sampling subunit and a frequency offset determining subunit.

The sampling subunit is configured to sample the first clock signal and the second clock signal to obtain a first digital signal and a second digital signal.

The frequency offset determining subunit is configured to determine, based on the first digital signal and the second digital signal, the frequency offset between the clock generating component and the reference clock.

In some embodiments, the switching unit includes a first determining subunit, a sending subunit and a second determining subunit.

The first determining subunit is configured to judge whether the first digital signal is a constant.

The second determining subunit is configured to judge, in response to the first digital signal being not a constant, whether the frequency offset is greater than a standard frequency offset.

The sending subunit is configured to send, in response to the first digital signal being a constant or the frequency offset being greater than the standard frequency offset, the switching signal to the clock switching component.

In some embodiments, the apparatus further includes a transmitting unit.

The transmitting unit is configured to transmit, in response to the first digital signal being a constant, to the managing component, fault information indicating that a clock stops oscillating, and transmit, in response to the first digital signal being not a constant and the frequency offset being greater than the standard frequency offset, fault information indicating that a frequency of a clock is abnormal to the managing component.

In some embodiments, in response to the clock generating component includes two clocks, a first output pin of the controller is connected to a first input pin of the managing component. A second output pin of the controller is connected to a second input pin of the managing component.

The transmitting unit is configured to control, in response to the first digital signal of the first clock being a constant or in response to the first digital signal being not a constant and the frequency offset being greater than the standard frequency offset, the first output pin to output a low level, to enable the managing component to display, in response to detecting that the first input pin is at a low level, warning information of a first clock fault.

In some embodiments, the apparatus further includes an accumulating unit, a number-of-times determining unit and a warning unit.

The accumulating unit is configured to increase the number of times of clock calling by one every time a switching signal is sent to the clock switching component. The number of times of clock calling is one in an initial state.

The number-of-times determining unit is configured to judge, in response to the first clock signal and the frequency offset both satisfy the set anomaly conditions, before the switching signal is sent to the clock switching component, whether the number of times of clock calling is less than a total number of clocks included in the clock generating component, and trigger, in response to the number of times of clock calling being less than a total number of clocks included in the clock generating component, the sending subunit to carry out the step that the switching signal is sent to the clock switching component.

The warning unit is configured to transmit, in response to the number of times of clock calling being greater than or equal to the total number of clocks included in the clock generating component, warning information indicating that a clock is unusable to the managing component.

In some embodiments, the apparatus further includes an adjusting unit.

The adjusting unit is configured to adjust, in response to receiving a reminder message indicating that a clock is successfully repaired sent by the managing component, the number of times of clock calling based on the number of clocks successfully repaired carried in the reminder message.

In some embodiments, the apparatus further includes a quantity determining unit.

The quantity determining unit is configured to judge whether a data amount of the first digital signal and a data amount of the second digital signal reach quantity thresholds, and trigger, in response to the data amount of the first digital signal and the data amount of the second digital signal both reach the quantity thresholds, the frequency offset determining subunit to carry out a step that based on the first digital signal and the second digital signal, the frequency offset between the clock generating component and the reference clock is determined.

In some embodiments, the frequency offset determining subunit is configured to multiply the first digital signal and the second digital signal together to obtain a mixed signal, extract a frequency deviation signal from the mixed signal, carry out fast Fourier transform on the frequency deviation signal to determine a frequency deviation point, and determine, based on the frequency deviation point and a number of sampling points, the frequency offset.

In some embodiments, the frequency offset determining subunit is configured to extract the frequency deviation signal from the mixed signal by a low filter.

In some embodiments, the frequency offset determining subunit is configured to carry out the fast Fourier transform on the frequency deviation signal, to obtain an impulse function with the number of sampling points as an abscissa and an operation result of the fast Fourier transform as an ordinate, and take a number of sampling points corresponding to a maximum operation result as the frequency deviation point.

In some embodiments, in response to the clock generating component includes a first clock and a second clock, the clock switching component is a 2:1 clock multiplexer. The controller is connected to a channel switching control signal pin of the clock switching component.

The sending subunit is configured to input a high level to the channel switching control signal pin to control the first clock to serve as a master clock, or input a low level to the channel switching control signal pin to control a second clock to serve as a master clock.

In some embodiments, the sampling subunit is configured to sample the first clock signal and the second clock signal at a set sampling frequency.

In some embodiments, the sampling subunit is configured to acquire accumulated operating time of the current clock, search for a corresponding relationship between operating time and a sampling frequency to determine a target sampling frequency matching the accumulated operating time, and sample the first clock signal and the second clock signal at the target sampling frequency.

The descriptions of the features in the embodiment corresponding to FIG. 5 can be obtained with reference to the related descriptions of the embodiment corresponding to FIG. 1, and will not be repeated herein.

It can be seen from the above solutions that a controller receives a first clock signal transmitted by a clock switching component. Based on the first clock signal and a second clock signal generated by a reference clock, a frequency offset between a clock generating component and the reference clock is determined. In response to the first clock signal and the frequency offset both satisfy set anomaly conditions, it is indicated that a current clock in the clock generating component is abnormal. In order to ensure normal operation of the clock generating component, the controller may send a switching signal to the clock switching component, to enable the clock switching component to control, based on the switching signal, the clock generating component to switch a current clock to a standby clock. A beneficial effect of the disclosure is that an operating state of the current clock can be identified by the controller based on the first clock signal and the frequency offset by arranging at least two clocks in the clock generating component. When the current clock is abnormal, the clock switching component can control the clock generating component to switch the current clock to the standby clock. Thus, smooth operation of a system service is ensured, and stability of system operation is improved.

It can be understood that in response to the switching method of a clock circuit in the above examples is implemented as a software functional unit and sold or used as a stand-alone product, the software functional unit may be stored in a non-transitory computer-readable storage medium. Based on such understanding, the solutions of the disclosure essentially, a part contributing to the prior art or all or a part of the solutions can be embodied in the form of a software product. The computer software product is stored in a non-transitory readable storage medium to execute all or some of the steps of the method in each example of the disclosure. The foregoing non-transitory readable storage medium includes various non-transitory readable storage media capable of storing program codes, such as a universal serial bus (USB) flash drive, a removable hard disk, a read-only memory (ROM), a random access memory (RAM), an electrically erasable programmable ROM, a register, a hard disk, a removable magnetic disk, a compact disc read-only memory (CD-ROM), a magnetic disk and an optical disk.

On this basis, an embodiment of the disclosure further provides a non-transitory computer-readable storage medium. The non-transitory computer-readable storage medium stores a computer program. The computer program implements steps of the above switching method of a clock circuit when executed by a processor.

The switching system, method and apparatus of a clock circuit, and the non-transitory computer-readable storage medium provided in embodiments of the disclosure are described in detail above. Each embodiment of the description is described in a progressive manner. Each embodiment focuses on the differences from other embodiment s. The same and similar parts between the embodiment s can be obtained with reference to each other. Since an apparatus disclosed in an example corresponds to a method disclosed in an embodiment, the descriptions are simple. Related content can be obtained with reference to the descriptions of the method.

Those skilled in the art can further realize that units and algorithm steps of various instances described in combination with examples disclosed herein can be implemented in a form of electronic hardware, computer software or a combination of both. In order to clearly illustrate the interchangeability of hardware and software, compositions and steps of various instances are generally described based on functions in the above descriptions. Whether these functions are executed by hardware or software depends on application and design constraints of the solutions. Those skilled in the art can implement the described functions through different methods for each particular application, but such implementation should not be considered as falling beyond the scope of the disclosure.

The switching system, method and apparatus of a clock circuit, and the non-transitory computer-readable storage medium provided in the disclosure are described in detail above. Optional instances are used for illustrating principles and embodiments of the disclosure herein. The descriptions of the above embodiments are only used for helping understand the method and its core concept of the disclosure. It should be noted that those of ordinary skill in the art can make several improvements and modifications without departing from the principles of the disclosure. These improvements and modifications also fall within the scope of protection of the disclosure.

What is claimed is:

1. A switching system of a clock circuit, comprising a clock generating component, a clock switching component and a controller, wherein the clock generating component comprises at least two clocks; a reference clock is integrated into the controller; the clock switching component is connected to the clock generating component and the controller, the clock switching component, configured to collect a first clock signal generated by the clock generating component and transmit the first clock signal to the controller, receive a switching signal sent by the controller, and control, based on the switching signal, the clock generating component to switch a current clock to a standby clock; the standby clock is any one of all other clocks of the clock generating component except the current clock; and the controller, configured to receive the first clock signal transmitted by the clock switching component, determine, based on the first clock signal and a second clock signal generated by the reference clock, a frequency offset between the clock generating component and the reference clock; and send, in response to that the first clock signal and the frequency offset both satisfy set anomaly conditions, the switching signal to the clock switching component, to complete clock switching in the clock generating component;

wherein the controller is configured to sample the first clock signal and the second clock signal to obtain a first digital signal and a second digital signal, and multiply the first digital signal and the second digital signal to obtain a mixed signal, extract a frequency deviation signal from the mixed signal, carry out fast Fourier transform on the frequency deviation signal to determine a frequency deviation point, and determine, based on the frequency deviation point and a number of sampling points, the frequency offset.

2. The switching system of a clock circuit as claimed in claim 1, wherein the controller is configured to sample the first clock signal and the second clock signal to obtain a first digital signal and a second digital signal, and determine, based on the first digital signal and the second digital signal, the frequency offset between the clock generating component and the reference clock.

3. The switching system of a clock circuit as claimed in claim 2, wherein the controller is configured to judge whether the first digital signal is a constant, send, in response to the first digital signal being a constant, the switching signal to the clock switching component, judge, in response to the first digital signal being not a constant, whether the frequency offset is greater than a standard frequency offset, and send, in response to the frequency offset being greater than the standard frequency offset, the switching signal to the clock switching component.

4. The switching system of a clock circuit as claimed in claim 3, wherein the controller is connected to a managing component,
the controller, configured to transmit, in response to the first digital signal being a constant, to the managing component, fault information indicating that a clock stops oscillating, and transmit, in response to the first digital signal being not a constant and the frequency offset being greater than the standard frequency offset, fault information indicating that a frequency of a clock is abnormal to the managing component.

5. The switching system of a clock circuit as claimed in claim 4, wherein the number of pins of the controller connected to the managing component is the same as the number of clocks comprised in the clock generating component.

6. The switching system of a clock circuit as claimed in claim 5, wherein in response to the clock generating component comprises two clocks, a first output pin of the controller is connected to a first input pin of the managing component, and a second output pin of the controller is connected to a second input pin of the managing component;
the controller, configured to control, in response to the first digital signal of the first clock being a constant or in response to the first digital signal being not a constant and the frequency offset being greater than the standard frequency offset, the first output pin to output a low level; and
the managing component, configured to display, in response to detecting that the first input pin is at the low level, warning information of a first clock fault.

7. The switching system of a clock circuit as claimed in claim 4, wherein the managing component is connected to a warning component,
the managing component, configured to control, in response to receiving fault information transmitted by the controller, the warning component to enable a warning mode matching a type of the fault information.

8. The switching system of a clock circuit as claimed in claim 7, wherein the warning component is an indicator light arranged on a front panel of a device;
the managing component, configured to control, in response to receiving the fault information indicating that a clock stops oscillating transmitted by the controller, the warning component to switch the indicator light corresponding to the current clock to a red light;
the managing component, configured to control, in response to receiving the fault information indicating that a frequency of a clock is abnormal transmitted by the controller, the warning component to switch the indicator light corresponding to the current clock to a yellow light.

9. The switching system of a clock circuit as claimed in claim 4, wherein the managing component is configured to display, in response to receiving fault information transmitted by the controller, the fault information through a human-computer interaction interface.

10. The switching system of a clock circuit as claimed in claim 4, wherein the controller is configured to increase the number of times of clock calling by one every time a switching signal is sent to the clock switching component, wherein the number of times of clock calling is one in an initial state; judge, in response to the first clock signal and the frequency offset both satisfy the set anomaly conditions, whether the number of times of clock calling is less than a total number of clocks comprised in the clock generating component; send, in response to the number of times of clock calling being less than the total number of clocks comprised in the clock generating component, the switching signal to the clock switching component; and transmit, in response to the number of times of clock calling being greater than or equal to the total number of clocks comprised in the clock generating component, warning information indicating that a clock is unusable to the managing component.

11. The switching system of a clock circuit as claimed in claim 10, wherein the controller is configured to adjust, in response to receiving a reminder message indicating that a clock is successfully repaired sent by the managing component, the number of times of clock calling based on the number of clocks successfully repaired carried in the reminder message.

12. The switching system of a clock circuit as claimed in claim 2, wherein the controller is configured to judge whether a data amount of the first digital signal and a data amount of the second digital signal reach quantity thresholds, and carry out, in response to the data amount of the first digital signal and the data amount of the second digital signal both reach the quantity thresholds, a step of determining, based on the first digital signal and the second digital signal, the frequency offset between the clock generating component and the reference clock.

13. The switching system of a clock circuit as claimed in claim 12, wherein the controller is configured to extract the frequency deviation signal from the mixed signal by a low filter.

14. The switching system of a clock circuit as claimed in claim 12, wherein the controller is configured to carry out the fast Fourier transform on the frequency deviation signal, to obtain an impulse function with the number of sampling points as an abscissa and an operation result of the fast Fourier transform as an ordinate, and take the number of sampling points corresponding to a maximum operation result as the frequency deviation point.

15. The switching system of a clock circuit as claimed in claim 1, wherein the clock switching component is a multiplexer, and a total number of channels of the multiplexer matches a number of clocks comprised in the clock generating component.

16. The switching system of a clock circuit as claimed in claim 15, wherein in response to the clock generating component comprises a first clock and a second clock, the clock switching component is a 2:1 clock multiplexer; and
the controller is connected to a channel switching control signal pin of the clock switching component;
the controller, configured to input a high level to the channel switching control signal pin to control the first clock to serve as a master clock;
the controller, configured to input a low level to the channel switching control signal pin to control a second clock to serve as a master clock.

17. The switching system of a clock circuit as claimed in claim 2, wherein the controller is configured to sample the first clock signal and the second clock signal at a set sampling frequency.

18. The switching system of a clock circuit as claimed in claim 17, wherein the controller is configured to acquire accumulated operating time of the current clock, search for a corresponding relationship between operating time and a sampling frequency to determine a target sampling frequency matching the accumulated operating time, and sample the first clock signal and the second clock signal at the target sampling frequency.

19. A switching method of a clock circuit, comprising:
receiving a first clock signal transmitted by a clock switching component;
determining, based on the first clock signal and a second clock signal generated by a reference clock, a frequency offset between a clock generating component and the reference clock; and
sending, in response to that the first clock signal and the frequency offset both satisfy set anomaly conditions, a switching signal to the clock switching component, to enable the clock switching component to control the clock generating component to switch a current clock to a standby clock based on the switching signal; wherein the standby clock is any one of all other clocks of the clock generating component except the current clock;
wherein determining, based on the first clock signal and a second clock signal generated by a reference clock, a frequency offset between a clock generating component and the reference clock comprises: sampling the first clock signal and the second clock signal to obtain a first digital signal and a second digital signal, and multiplying the first digital signal and the second digital signal to obtain a mixed signal, extracting a frequency deviation signal from the mixed signal, carrying out fast Fourier transform on the frequency deviation signal to determine a frequency deviation point, and determining, based on the frequency deviation point and a number of sampling points, the frequency offset.

20. A non-transitory computer-readable storage medium, storing a computer program, wherein the computer program executed by a processor, the computer program following actions:
receive a first clock signal transmitted by a clock switching component;
determine, based on the first clock signal and a second clock signal generated by a reference clock, a frequency offset between a clock generating component and the reference clock; and
send, in response to that the first clock signal and the frequency offset both satisfy set anomaly conditions, a switching signal to the clock switching component, to enable the clock switching component to control the clock generating component to switch a current clock to a standby clock based on the switching signal; wherein the standby clock is any one of all other clocks of the clock generating component except the current clock;
sample the first clock signal and the second clock signal to obtain a first digital signal and a second digital signal, and multiply the first digital signal and the second digital signal to obtain a mixed signal, extract a frequency deviation signal from the mixed signal, carry out fast Fourier transform on the frequency deviation signal to determine a frequency deviation point, and determine, based on the frequency deviation point and a number of sampling points, the frequency offset.

* * * * *